Feb. 17, 1959  J. A. KRINGLEN  2,873,868
LIFTING AND LOWERING MECHANISM FOR TAIL GATES
Filed Aug. 15, 1957  2 Sheets-Sheet 1
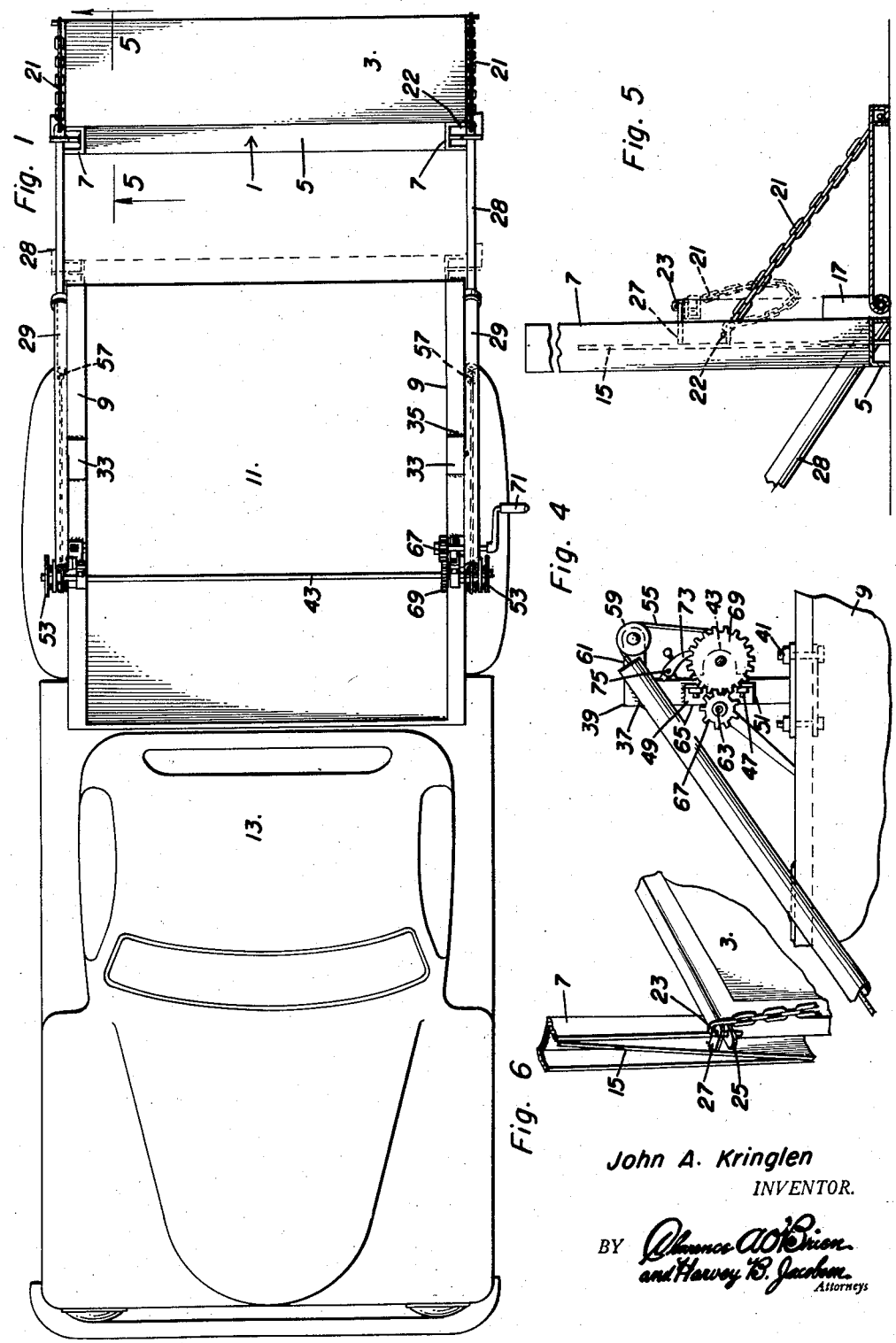
John A. Kringlen
INVENTOR.

Feb. 17, 1959     J. A. KRINGLEN     2,873,868
LIFTING AND LOWERING MECHANISM FOR TAIL GATES
Filed Aug. 15, 1957     2 Sheets-Sheet 2
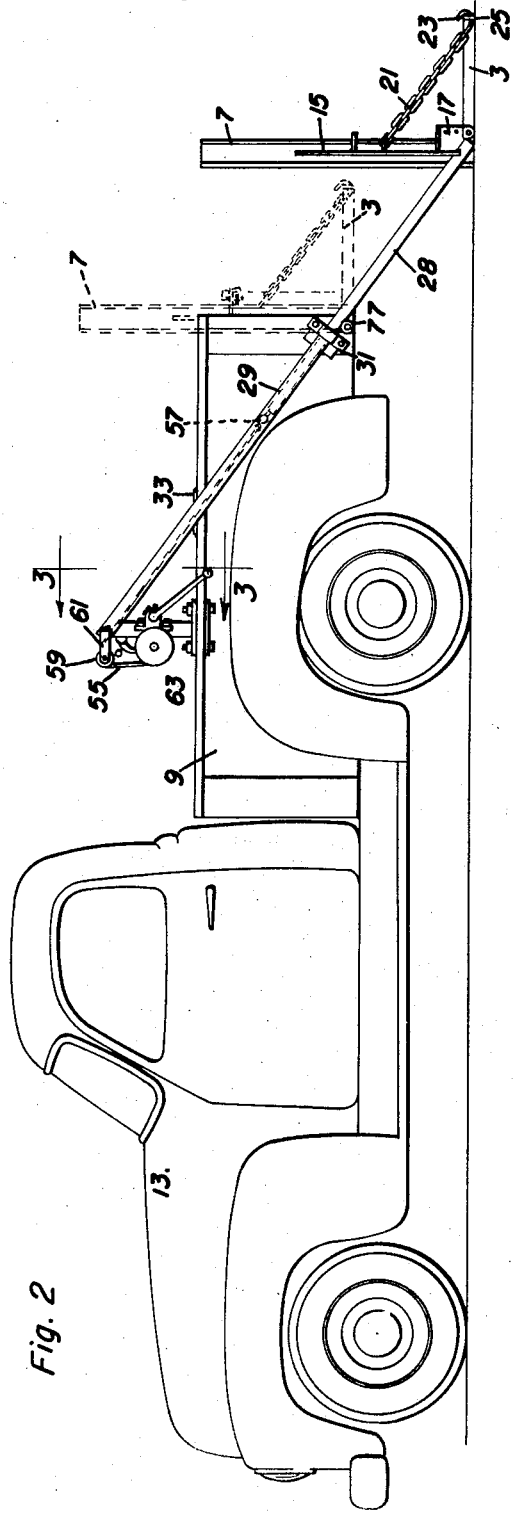
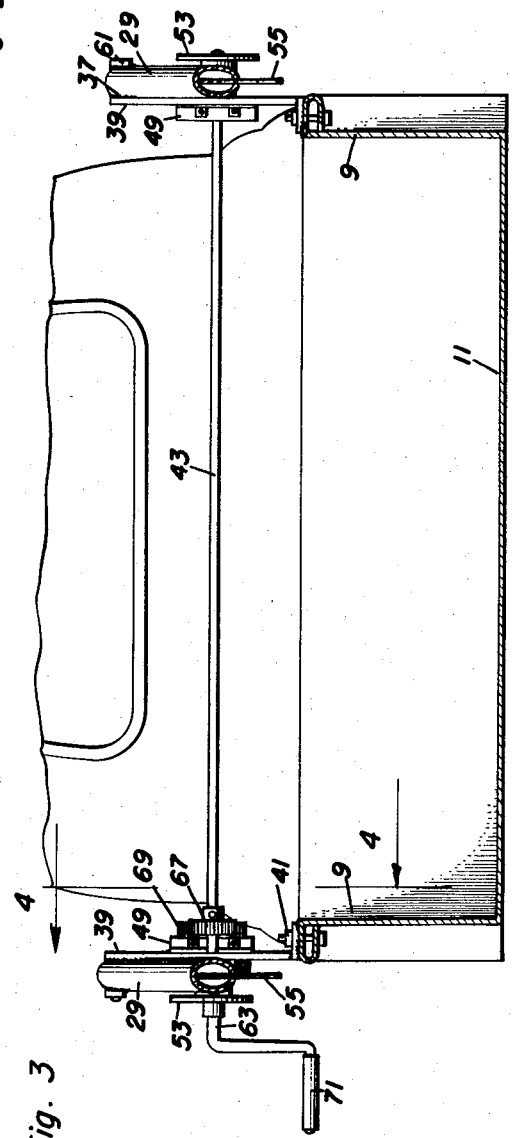
John A. Kringlen
INVENTOR.

2,873,868

LIFTING AND LOWERING MECHANISM FOR TAIL GATES

John A. Kringlen, Grand Forks, N. Dak.

Application August 15, 1957, Serial No. 678,310

2 Claims. (Cl. 214—75)

My invention relates to improvements in lifting and lowering mechanisms for the end tail gates of automotive delivery and service trucks, especially, although not necessarily, of the box body type.

The primary object of my invention is to provide mechanism for lowering and elevating such tail gates for use of the same in unloading and loading cargo at the rear of the truck body and which is easy to operate quickly by one man with the tail gate heavily loaded.

Another object is to provide mechanism for the above purpose which is safe to use and adapted to be readily and inexpensively installed on present box body trucks and which is comparatively inexpensive to manufacture and service.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in top plan of my improved lifting and lowering mechanism installed on a truck body and with the tail gate opened for lowering;

Figure 2 is a view in side elevation of the same with the tail gate drawn lowered in full lines and elevated in broken lines;

Figure 3 is an enlarged fragmentary view in vertical transverse section taken on the line 3—3 of Figure 2;

Figure 4 is an enlarged fragmentary view in side elevation of parts of crank operated means for lifting the tail gate taken on the line 4—4 of Figure 3 and partly in section;

Figure 5 is an enlarged view in vertical section partly broken away and taken on the line 5—5 of Figure 1; and Figure 6 is an enlarged perspective view of part of the elevator frame and means for locking the tail gate closed.

Referring to the drawings by numerals, according to my invention, an elevator frame, designated generally by the numeral 1, is provided for the tail gate 3 and which is of U-form and comprises a base bar 5 with a pair of upright bars 7 suitably fixed to and rising therefrom and spaced apart substantially the same distance as that between the sides 9 of the box body 11 of a truck 13. The bars 5, 7 are of channel form with channels facing outwardly, and the end bars 7 are provided with a pair of central longitudinal reinforcing ribs 15 extending outwardly of the channels thereof and are also provided at their lower ends with a pair of rearwardly extending gusset plates 17.

The tail gate 3 is pivoted, as at 19, between the gusset plates 17 to swing upwardly against the end bars 5 in closed position or to swing downwardly into rearwardly extending horizontal opening position for supporting a load thereon.

A pair of chains 21 are provided as means for holding the tail gate in open position and locking the same in closed position and for this purpose are terminally pivoted at front ends thereof on eye members 22 on the ribs 15 and provided with terminal hooks 23 for insertion in apertured corner ears 25 on the tail gate 3 whereby the chains 21 suspend the tail gate 3 in open position as best shown in Figure 5 and the end bars 7 are provided with apertured ears 27 lying above the ears 25 when the tail gate 3 is closed and through which and the ears 25 the hooks 23 are insertable to lock the tail gate 3 closed as shown in Figure 6.

Means for operating the elevator frame 1 is provided whereby said frame is raised against the rear ends of the sides 9 of the body 11 or lowered rearwardly of said body in upright position. This means comprises a pair of slide rods 28 at opposite sides 9 of the body 11 to which the elevator frame 1 is attached, as presently described, and which work in a pair of tubular guides 29 fixedly mounted on the sides 9. The slide rods 28 and guides are preferably positioned outwardly of the sides 9 and extend obliquely downwardly and rearwardly longitudinally of the body 11 with the slide rods 28 extending rearwardly out of the guides 29 for gravitational projection rearwardly of the body 11 downwardly and retraction upwardly to lower and raise the elevator frame 1 and lower and raise the tail gate 3.

The elevator frame 1 is attached to and between the rear ends of the slide rods 28 as by welding not shown. The guids 29 are fixed at their rear ends to the sides 9 by bolts or brackets 31 and between their ends by plates 33 thereon welded as at 35 on top of the sides 9 and incline at their front ends above the sides 9 with said front ends welded as at 37 to the upper ends of upstanding brackets 39 bolted, as at 41, on top of said sides 9 and serving a particular purpose presently seen.

Crank operating cable wind-up means is provided for retracting the slide rods 28 and controlling projection thereof. This means comprises a reel shaft 43 extending across the body 11 and through a pair of bearing brackets 45 bolted, as at 47, on angle bars 49 welded, as at 51, to sides of said brackets at intermediate points thereon.

A pair of cable reels 53 are suitably fixed on the ends of shaft 43 outwardly of the sides 9 and to which a pair of cables 55 are suitably attached at one end thereof for winding on and unwinding off said reels and have their other ends extending into the front ends of the guides 29 and suitably fixed to eyes 57 on the front ends of the slide rods. A pair of idler pulleys 59 are provided on forwardly extending plates 61 on the upper ends of the bracket 39 and over which the cables 55 are trained downwardly to the reels 53.

Operating means for the shaft 43 is provided on one bracket 39 at one side 9 of the body 11 and comprises a short crank operated shaft 63 journaled through a bearing 65 on the angle bar 49 of said one bracket 39, this shaft having a small gear 67 on one end meshing with a larger gear 69 fast on the reel shaft 43, said crank operated shaft having a hand crank 71 on its other end spaced outwardly of the body 11 for operating the reel shaft 43.

A conventional releasable holding dog 73 is pivoted on the bracket 39, as at 75, for ratcheting engagement with the gear 69 to prevent reverse operation of the reels 53 and unwinding of the cables 55.

At the rear ends of the guides 29 a roller 77 is provided in each side 9 of the body 11 for supporting the slide rods 28.

In operating this invention, in unloading the truck 13, the tail gate 3 is opened as shown in dotted lines in Figure 2 in its elevated position and loaded from the body 11. The holding dog 73 is then released, whereupon the tail gate 3 will gravitate to the full line position shown in Figure 2 to lower the load to the ground. Of course, during this operation the slide rods 28 will gravitate rearwardly outwardly of the guides 29 and descend from retracted to projected position, and this operation of the slide rods 28 may be controlled as to speed and timing by retarding operation of the cable wind-up means. To elevate the tail gate 3 from lowered position it is merely necessary to wind up the cable 55 on the reel 53 by operating the hand crank 71 to retract the slide rods 28 into the guides 29.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Mechanism for lowering and raising the tail gate of a truck body for use in unloading and loading cargo comprising an elevator frame having side uprights and a base bar to which the tail gate is hinged for opening into horizontal position for loading with cargo, a pair of elongated slide members on opposite sides of said body extending longitudinally thereof and having rear ends between which said frame is fixed at its sides, means at opposite sides of said body secured thereto and guiding such members diagonally longitudinally of said body for gravitational advance downwardly and rearwardly and retraction upwardly and forwardly to lower and raise said frame and tail gate in a diagonal path, and manipulative means mounted on said body and operatively connected to said member to retract the members and control advance thereof, said manipulative means comprising a reel shaft having a pair of reels on each end thereof, means for mounting said reel shaft on sides of a truck body transversely thereof and including brackets, cables on said reels for winding up thereon and operatively connected to front ends of the slide members, a crank operated gear on one of said brackets, and a larger gear on said shaft meshing with the crank operated gear.

2. Mechanism as in claim 1, and a releasable holding dog on said one bracket for one of said gears.

References Cited in the file of this patent

UNITED STATES PATENTS

| | | |
|---|---|---|
| 1,953,056 | Olen | Mar. 27, 1934 |
| 2,110,239 | Richter | Mar. 8, 1938 |
| 2,234,255 | Hunsaker | Mar. 11, 1941 |
| 2,498,161 | Hamilton | Feb. 21, 1950 |
| 2,706,565 | Krasno | Apr. 19, 1955 |
| 2,711,260 | Butler | June 21, 1955 |
| 2,761,571 | Adams | Sept. 4, 1956 |